John C. Kearns.
Fruit Picker.

116,718   PATENTED JUL 4 1871

Witnesses.
J. W. Mister
A. Ruppert

Inventor
John C. Kearns
Per Eedom Brothers
Attorneys.

UNITED STATES PATENT OFFICE.

JOHN C. KEARNS, OF LEWISTOWN, PENNSYLVANIA.

IMPROVEMENT IN FRUIT-GATHERERS.

Specification forming part of Letters Patent No. 116,718, dated July 4, 1871.

*To all whom it may concern:*

Be it known that I, JOHN C. KEARNS, of Lewistown, in the county of Mifflin and State of Pennsylvania, have invented a new and useful Improvement in Fruit-Pickers; and I do hereby declare the following to be a full, clear, and exact description thereof, reference being had to the accompanying drawing forming a part of the same, and in which—

Figure 1:
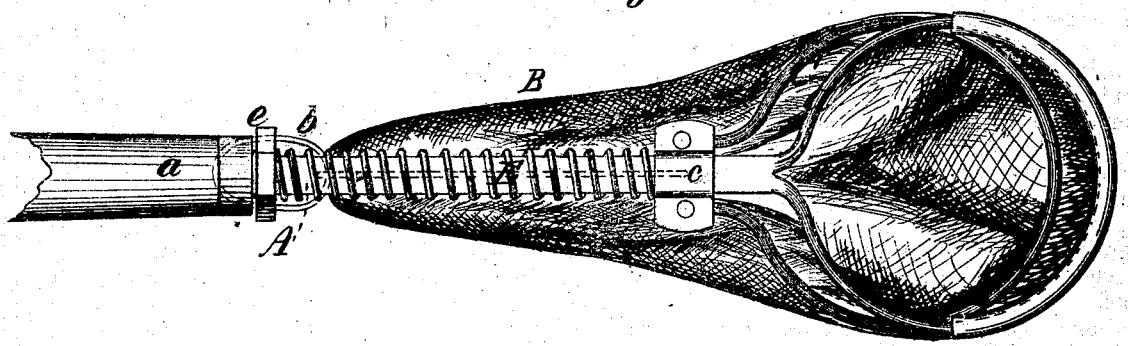
Figure 2:
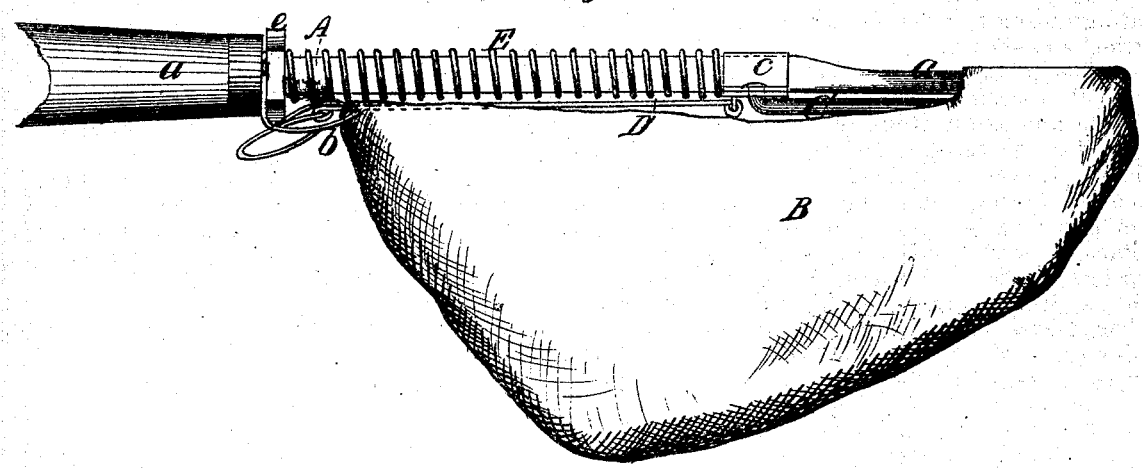

Figure 1 represents a top or plan view of my improved fruit-picker, and Fig. 2 a side view thereof.

Similar letters of reference in the two figures refer to like parts.

This invention has reference to an improved fruit-picker; and it consists of a sliding ring-like device, in combination with a bar having a ring, to which the receptacle or bag for receiving the fruit being gathered is attached, arranged and operating substantially in the manner hereinafter described and shown.

To enable others to make and use my invention, I will proceed to describe it.

A in the annexed drawing refers to a bar made of any suitable material and of any desired shape, and is supplied at one end with a handle, $a$, and at its opposite end with a ring, $a'$. To the outer half of this ring is suitably secured the bag or receptacle B, at its open end or mouth, the opposite or inner end of said receptacle being secured to the handle $a$ of the staff A by means of a wire bar or loop, $b$. C refers to a sliding ring-like device, the ends of which are riveted or otherwise fastened to the wings or flanges of a loop, $c$, fitting and movable upon the bar A. This ring-like device, when at rest, occupies a position directly beneath the ring $a'$, in connection with which, by drawing the same past the latter-named device when brought in contact with the fruit, the said fruit will be removed from the tree and precipitated into the bag or receptacle B. D refers to a rod or wire attached at one end to the loop $c$ of the ring-like device C, and supplied at its opposite end with a loop or ring for conveniently grasping and operating it, the said loop or ring being retained in position ready for grasping by means of the loop $b$, through which the said rod passes. E refers to a spiral spring encircling the bar A, between the loop $c$ and a shoulder or plate, $e$, secured upon the bar A, and is for the purpose of throwing the ring-like device C back to its original position after having been withdrawn past the ring $a'$, at which time, as hereinbefore mentioned, the fruit is clipped or gathered from the tree and allowed to fall into the receptacle B.

Having thus described my invention, what I claim, and desire to secure by Letters Patent, is—

The sliding ring C $c$, in combination with the bar A, stationary ring $a'$, spring E, rod D, bag B, and handle $a$, arranged and operating substantially as shown, and for the purpose set forth.

JOHN C. KEARNS.

Witnesses:
E. D. BUHN,
L. J. ELBERTY.